April 13, 1965   J. H. COOPER ETAL   3,178,554
METHOD AND APPARATUS FOR THE FUSION JOINING OF STRIP
Filed Jan. 12, 1962   3 Sheets-Sheet 1

INVENTORS
JOSEPH H. COOPER
BY MELVIN M. SEELOFF
CHARLES R. CHEW
ATTORNEY

INVENTORS
JOSEPH H. COOPER
MELVIN M. SEELOFF
CHARLES R. CHEW
BY Francis J. Klempay
ATTORNEY April 13, 1965   J. H. COOPER ETAL   3,178,554
METHOD AND APPARATUS FOR THE FUSION JOINING OF STRIP
Filed Jan. 12, 1962   3 Sheets-Sheet 3

INVENTORS
JOSEPH H. COOPER
BY MELVIN M. SEELOFF
CHARLES R. CHEW
*Francis J. Klumpay*
ATTORNEY

United States Patent Office 3,178,554
Patented Apr. 13, 1965

3,178,554
METHOD AND APPARATUS FOR THE FUSION JOINING OF STRIP
Joseph H. Cooper and Melvin M. Seeloff, Warren, and Charles R. Chew, Chagrin Falls, Ohio, assignors to The Taylor-Winfield Corporation, Warren, Ohio, a corporation of Ohio
Filed Jan. 12, 1962, Ser. No. 165,770
12 Claims. (Cl. 219—125)

This invention relates to the art of joining metal sheets or strip in general end-to-end relation, and more particularly to an improved method and apparatus for combining the necessary edge preparation of the workpieces with a fusion welding process which permanently joins the workpieces. Whether welding the edges in generally abutting relation by an electric arc or gas heating process or in narrowly overlapped relation by an electric resistance mash seam welding process it is highly important that the edges to be welded together are prepared in specific dependence on the kind of weld desired or deemed necessary for the particular work at hand. Also, to consistently achieve sound full welds and resultant products of acceptable quality and tolerances under modern standards it is essential that the edges to be welded together be maintained very accurately in predetermined relation to each other at the start of and during the welding cycle.

It is accordingly the primary object of this invention to provide in apparatus for fusing together the end or edge portions of metal sheets or strip an improved method and instrumentality for preparing the ends or edges for fusing and for properly holding these extremities at the start of and during the fusing process. More specifically, the object is to provide such method and device which is rapid and practical in operation but which nevertheless is operative to provide edges of improved characteristics as regards shape and surface texture whereby the subsequent fusion will be more expeditiously accomplished and be of a consistently higher quality. An ancillary object is to improve the edge preparation and method of clamping and manipulating the workpieces closely adjacent the edges whereby the same general apparatus may be used for a number of different fusion processes. This vastly increases the versatility of the assembled apparatus in that when installed in any particular line of equipment it can be used on stock of widely varying gauge and physical characteristic, requiring different welding techniques.

The above objects are accomplished in accordance with the present invention primarily by the use of high-speed powerfully-driven abrasive cutoff wheels to trim the workpieces immediately prior to welding and while the workpieces are secured in rugged welding clamps. This type of cut not only results in a fine surface texture which is better suited for the varying welding procedures but is also capable of rapidly trimming any kind of stock— of thin or very heavy gauge and of mild or heavily alloyed tough steels. Further, this kind of cut is noted for its precision, and if the wheels employed are accurately guided perfectly linear and parallel edges will result. Also, by tilting the clamps varying degrees of bevel may be imparted to the edges which upon straightening out and bringing together of the clamps will provide a V-shaped welding groove to receive added fusion metal or to insure that a sound continuous weld is obtained without any metal projecting above the upper surface of the strip.

A further object of the invention is the provision of improved apparatus for carrying out the above methods and for combining the described edge preparation means with the stock clamps and the welding apparatus used. As regards the latter, provision is made for wide versatility as to specific method selected.

More specific objects of the invention are the provision of improved stock clamping assemblies in a strip joining unit, improved means for manipulating said assemblies for edge preparation and for welding, and improved devices for supporting and manipulating the strip lengths prior to welding and the continuous strip after welding.

A salient advantage of the methods and apparatus of our invention is the ability to rapidly join a wide range of stock, including thick tough stainless steel, by the use of minimum apparatus which is entirely practical as regards complexity and cost. While it has heretofore been proposed to prepare the strip edges for welding by shearing while the workpieces are held in the weld clamps (to insure coincidence and alignment with the welding fixture) the shear precision required for light gauges and the great shear power and strength required for heavy tough strip poses many problems in design and cost. Further complications arise if the edges to be welded together are required to be beveled. These problems are all overcome by the present invention.

The above and other objects and advantages of the invention will become apparent upon consideration of the following specification and the accompanying drawing wherein there is disclosed a preferred embodiment of the invention.

Figure 2:
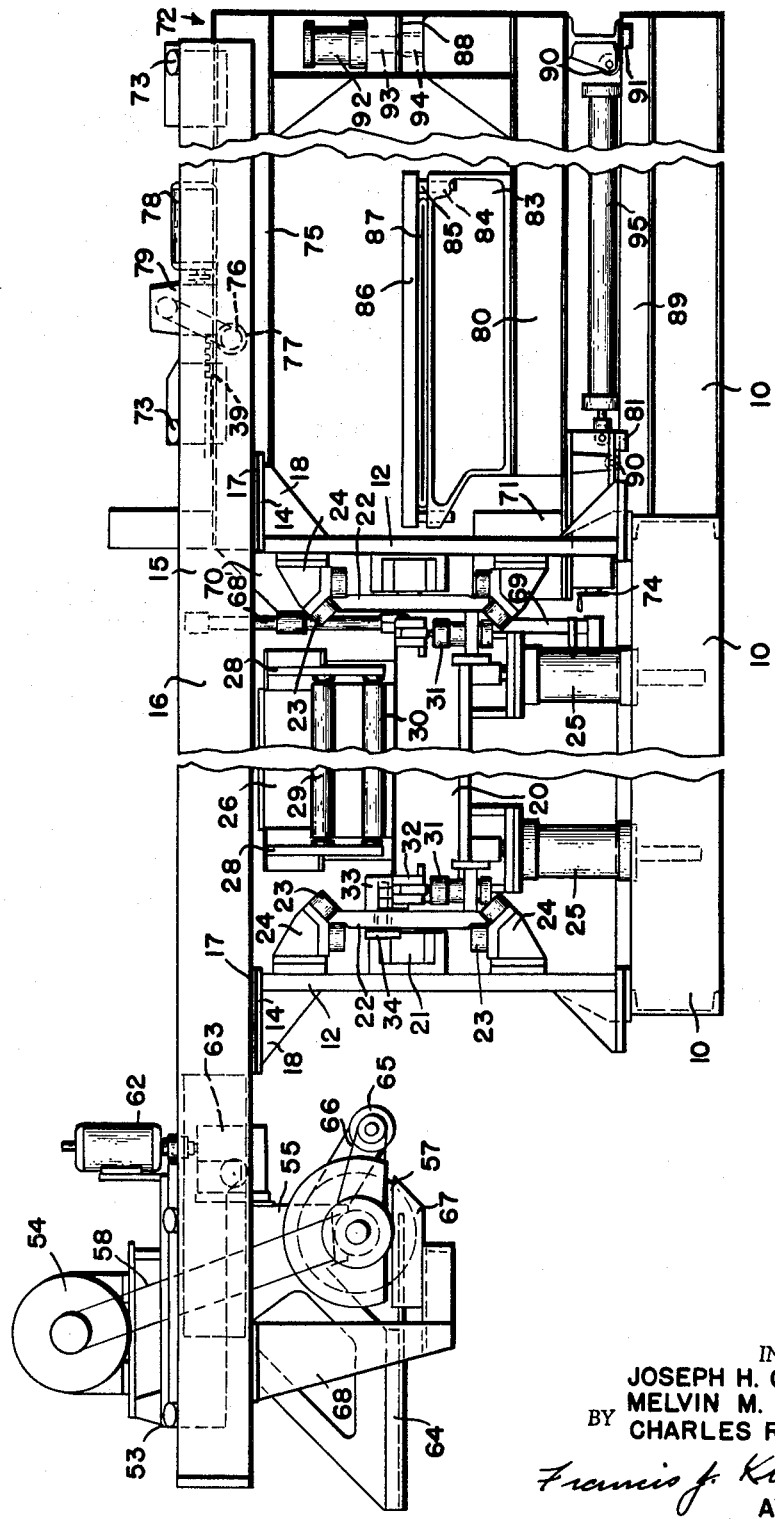
FIGURE 2 is a broken end elevation of the apparatus of FIGURE 1, viewing the apparatus from the strip exit end thereof.
Figure 5:
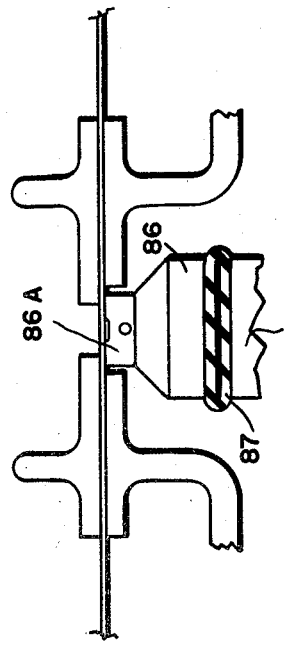
Figure 4:
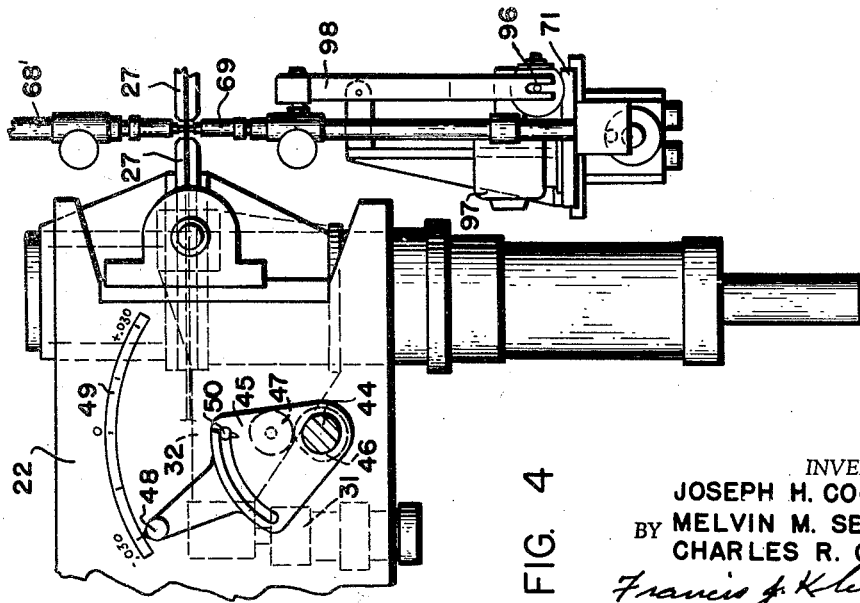

FIGURE 4 is a fragmentary elevation of one of the strip clamps showing its relation to upper and lower electric arc welding torches and showing an arrangement for moving the edge of the strip length held in the clamp upwardly or downwardly in relation to the other strip length to be joined; and FIGURE 5 is a detailed view of means for raising and lowering a welding backup bar employed in the assembly of FIGURE 2.

Figure 1:
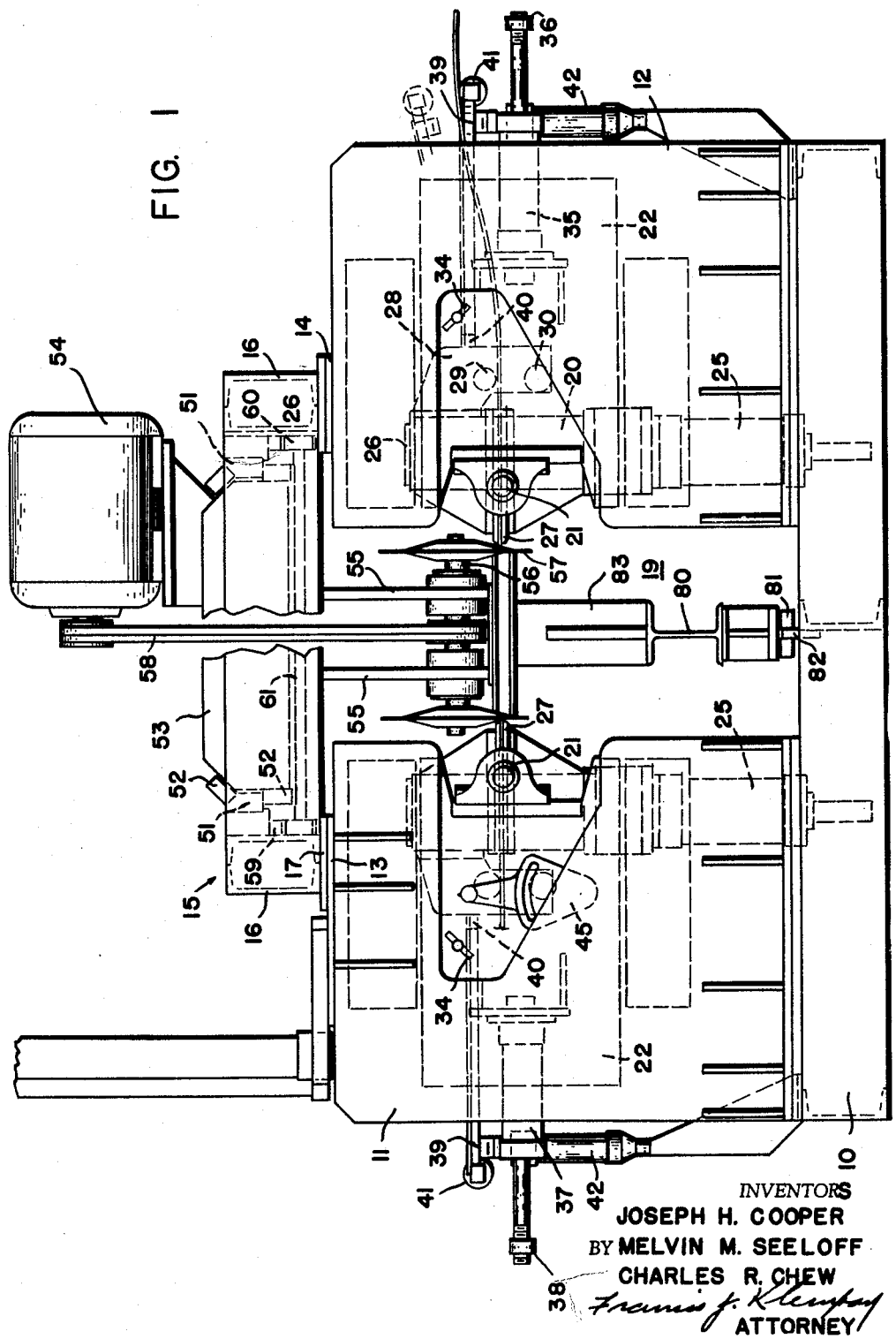
FIGURE 1 is a side elevation of assembled apparatus constructed in accordance with the principles of our invention.

The main supporting structure for the apparatus illustrated comprises a base 10 on which is mounted two pairs of plate-like vertically disposed frame members 11 and 12 with the members of each pair being generally parallel and transversely opposite each other, as shown in FIGURE 2, and with the pairs being disposed in longitudinal spaced relation as shown in FIGURE 1. The upper ends of the members 11 and 12 are provided with horizontally disposed pads 13 and 14, respectively, on which is supported a horizontal elongated and transversely extending craneway structure 15. This structure is in the nature of an open frame having box-section side rails 16 rigidly welded to plates 17 which overlie the pads 13 and 14. Since the beams or side rails 16 extend at right angles to the planes of the frame members 11 and 12, these rails 16 will retain their parallelism and spacing. Gussets 18 extending outwardly of the planes of the members 11 and 12 and welded to the pads 14 lend longitudinal stability to the craneway 15.

The structure described above provides an extremely rigid box-like supporting assembly having a transverse opening or window 19 therethrough centrally below the craneway 15 so that the strip trimming and welding devices movably supported on the craneway in depending relation therewith may traverse across strip lengths held longitudinally in the apparatus and projecting into or spanning the opening 19. Of course, the frame structure has a thru-opening in a longitudinal direction to receive and allow passage of strip, and positioned in this longitudinal thru-opening are the strip clamps now to be described.

An entry strip clamp is mounted for longitudinal sliding movement between the two transversely spaced frame members 11 and a similar but exit strip clamp is slideably mounted between the two transversely spaced frame members 12. Since these clamps and their mountings are substantially identical, only one will be described in detail. Thus, the exit strip clamp comprises a transversely extending lower platen 20 which is pivotally mounted at 21 at either transverse end to a pair of spaced parallel slides 22 which are anti-frictionally guided in ways formed of the rollers 23.

As shown in FIGURE 2, these rollers 23 are carried by upper and lower brackets 24 which project inwardly from the frame members 12 and which guide the slides 22 for longitudinal movement in the assembly. Of course, at least two sets of longitudinally spaced rollers 23 are provided for this purpose.

Lower platen 20 mounts in depending relation a pair of vertically disposed cylinders 25, the piston rods of which extend up through the platen 20 and are rigidly connected at their upper ends with an upper clamping platen 26. Since the width of strip to be handled may be quite substantial, the platens 20 and 26 are preferably of box-beam section to provide adequate resistance against deflection while yet enabling the rods of cylinders 25 to be positioned well outside the path of travel of the strip. As shown in FIGURE 1, the platens 20 and 26 have strip-engaging wear plates 27. To protect these plates against abrasion by the rapidly moving strip, the upper platen 26, by means of brackets 28, mounts an upper protector roll 29 and a power strip lift roll 30. As shown in FIGURE 1, when the upper platen 26 is full retracted, the lower roll 30 supports the strip at the free strip pass line through the apparatus, and the upper roll 30 extends slightly below the upper clamp plate 27 to keep the rapidly moving strip off the latter.

To tilt the clamping assembly described above about the axis 21 we provide a pair of cylinders 31 which are pivotally mounted on the slides 22 and which have their rods pivotally connected to arms 32 extending outwardly of the platen 20. The extent of tilting of the clamp assembly is determined by the setting of a rotatable stop block 33 which is carried by one of the slides 22 and which has an operating handle 34 accessible from the exterior of the machine. The gauge or stop block 33 is so formed that the distances between its separate faces and its axis of rotation vary so that the degree of tilt of the clamping assembly is determined by which face is presented to the arm 32.

To move the exit clamp longitudinally we provide a pair of longitudinally disposed cylinders 35, one on either side of the machine, and carried by the frame members 12. Double-ended piston rods are provided for the cylinders 35 so that one or the operating end of each may be connected to a slide 22 while the opposite end is provided with an adjustable stop nut 36 whereby the inward movement of the slide 22 and consequently of the exit strip clamp may be precisely controlled. Similar cylinders 37 having adjustable stop nuts 38 are provided to move the entry strip clamp longitudinally in the apparatus. Instead of having the stop nuts 36 and 38 adjustable on the rods of the cylinders 35 and 37 the same may be fixed on the rods and adjustable stop plate mechanisms used such as shown in U.S. Patent No. 2,636,966, issued April 28, 1953.

For a purpose to be later described, we provide at each longitudinal end of the apparatus a frame 39 which is pivoted at 40 on the brackets 28 for upward swinging movement and which mounts at its outer free end a transversely disposed stock supporting roll 41. Cylinders 42 are provided to raise and lower the frames 39 and thus the strip supporting rolls 41, and it should be apparent from FIGURE 1 that when the strip clamps are retracted and open and the cylinders 42 collapsed, the rolls 41 support the strip at the free pass line through the apparatus.

Figure 3:
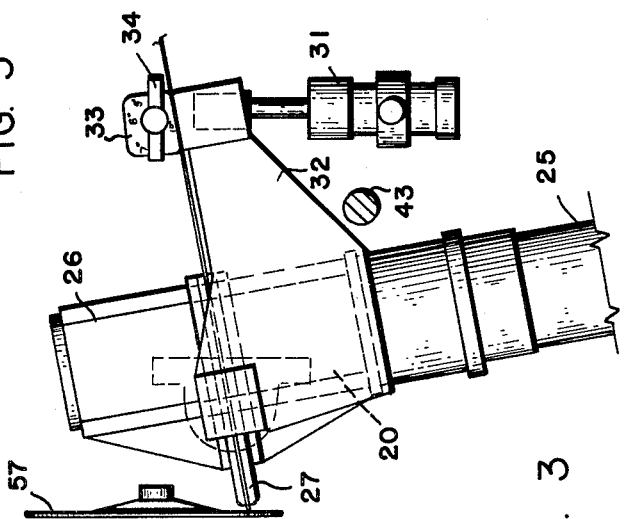
FIGURE 3 is a fragmentary view of a strip clamp of the assembly of FIGURES 1 and 2 shown in tilted position to provide a beveled edge on the strip length clamped.

When the cylinders 31 for the exit clamp shown in FIGURE 3 are energized in a direction to bring the clamp plates 27 horizontal, the arms 32 are brought against a stop 43 which is in the form of a heavy rod spanning the slides 22. When welding some materials it may be necessary to overlap the workpieces instead of abutting their edges. In this case the stop 43 would be made adjustable and so positioned that when the arms 32 were pulled against the stop by the cylinders 31 the clamped strip on this side of the machine would be positioned above the clamped strip on the opposite side of the machine, thereby allowing one end of the strip to pass above the other to form an overlap. The action of the cylinders 31 are then reversed and the arms 32 are pushed against a correctly selected position of stops 33 which will allow the strip ends to lay one on top of the other. In some procedures it may be desirable to slightly shift the relative vertical positions of the strip edges to be welded together, and this is accomplished by the mechanism shown in FIGURE 4. This mechanism includes a shaft 44 which is rotatable in the slides 22 and to which is connected a lever 45 overlying the outer face of one of the slides. Keyed to the shaft 44 and located on opposite sides of the machine are the cams 46 which are adapted to be engaged by followers 47 mounted on the arms 32 of the entry clamp lower platen. Lever 45 has an operating knob 48 and a pointer which coacts with a vernier scale 49 mounted on the face of the slide 22. A locking means in the form of a screw 50 riding in an arcuate slot is provided to lock the lever 45 in adjusted position. The shape of the cams 46 is such that the tilt retraction stop provided by the parts 46 and 47 may operate to finally position the projecting free end of the strip in the entry clamp a small distance above or below a horizontal median plane.

Rigidly mounted on the inner faces of the side beams 16 of the craneway assembly 15 are tracks 51 having bottom surfaces and sloped upper surfaces adapted to be engaged by cam follower type rollers 52 of the carriages for mounting the abrasive wheel trimming assembly and the welding assembly. The former, shown in FIGURES 1 and 2, comprises a box-like frame 53 on which is mounted a motor 54 for driving the abrasive wheels and from which depends a pair of spaced parallel brackets 55 for mounting the spindle 56 carrying the abrasive wheels 57. A multiple V belt 58 interconnects a pulley on motor 54 with a pulley on spindle 56 to drive the latter. To drive the carriage 53 along the tracks 51 there is provided continuous racks 59 adjacent each side rail for engagement with pinion gears 60 keyed onto the end of a transverse shaft 61 driven by a motor 62 through a speed reducer 63.

Carried by the brackets 55 and thus movable along with the abrasive wheels 57 is a tray 64 whose side walls are vertical and directly behind and aligned with the wheels. The bottom wall of this tray moves in a plane slightly below the plane of the strip being cut and the tray is open in the direction of the wheels so that the tray is operative to receive and retain the scrap cutoff by the abrasive wheels. The cuts are made as the carriage 53 moves inwardly, and the scrap pieces simply slide into the tray 64. After the scrap is completely severed, it remains in the tray and is brought back out to the position shown in FIGURE 2 for easy removal. Also movable along with the abrasive wheels and slightly ahead thereof are the small wire brush or sanding wheels 65 which are mounted on a spindle journaled in extensions of the brackets 55 and driven from the main spindle by a belt 66. The purpose of the wheels 65 is to remove any burrs which are set up by the main abrasive wheels as the latter are retracted back to their standby positions shown in FIGURE 2. The wheels 65 are sufficiently flexible in a radial direction to ride on top of the workpieces during the cutting traverse of the wheels 57. We also provide a stationary pan-like guard 67 to receive the lower exposed portions of the wheels 57 when the latter are retracted to standby positions. Guard 67 is carried by a bracket 68 depending from the craneway structure 15, and this bracket 68 is sufficiently open to allow passage of the tray 64.

While various kinds of specific welding apparatus may be used in the combinational machine of this invention, the preferred and illustrated type is an electric arc torch or torches. The specific nature of the welding apparatus will depend on the gauge and character of the strip being welded. Thus, we may employ either tungsten or consumable electrodes, and the work may be welded only on the upper surface or on both the upper and lower surfaces as needs dictate. The welding heads or torches per se are no part of the present invention and are accordingly only schematically shown in the drawing.

In the drawing, the upper arc welding torch is designated by the reference numeral 68' while the lower torch is shown at 69. See FIGURES 2 and 4. These torches are carried by suitable brackets 70 and 71 fixed on the open end portions of a large C-shaped frame 72 which is suspended on rollers 73 from the rails 51 of the craneway assembly 15. Bracket 71, supporting the lower torch 69, is slideable longitudinally on the lower leg of the C-frame 72 under the precise control of a hand wheel 74. This adjustable connection permits the arc emitted by the lower torch 69 to be directly opposite the arc of the upper torch or to be adjusted in lagging or leading relation thereto as will be understood.

Mounted on the upper horizontal reach 75 of the C-frame 72 is a transverse shaft 76 which mounts pinions 77 meshing with the continuous racks 59. Shaft 76 is arranged to be driven by a motor 78 through a reducer 79 whereby the C-frame 72 may be moved to the left as viewed in FIGURE 2 and then retracted upon completion of a welding cycle. As shown in FIGURE 1, the lower horizontal beam 80 of the C-frame is guided by cam follower rolls 81 engaging a rail 82 which is fixed on the base 10. In this manner both of the elongated horizontal beams of the C-frame 72 are accurately guided with respect to each other so that the arcs emitted from the torches 68' and 69 on opposite faces of the strip being welded will remain aligned with each other during their traverse of the strip.

As described above, the C-frame 72 moves as a unit to carry both the top and bottom torches 68' and 69. In some welding procedures only the top torch will be used, and in accordance with known practice in the fusion welding of sheets or strip in end-to-end relation, it is sometimes desirable to place a heavy heat-conductive bar under the joint being welded and in contact with the undersurfaces of the workpieces. To enable this to be done in the apparatus above described we rigidly mount a table 83 on the lower horizontal beam of the C-frame 72, which table is provided with vertically disposed bores 84 to slideably receive guide pins 85 depending downwardly from the backup bar holder 86. This holder 86 mounts the current-conducting pickup bar 86A. Interposed between the table 83 and the holder 86 is an inflatable air tube 87 which upon being supplied with compressed air raises the backup bar 86A into yielding pressure contact with the undersurfaces of the workpieces held in the clamps of the apparatus, all as shown in FIGURE 5.

To enable the bar 86A to be positioned between the clamps and below the workpieces while the upper torch 68 remains in its initial starting or standby position shown in FIGURE 2 the C-frame 72 is slit at 88 into top and bottom sections. The lower section is independently and movably supported on a pair of spaced parallel tracks 89 by means of rollers 90, and the outer end of this lower section is additionally guided by cam follower rolls 91 engaging opposite sides of the rails 89. A cylinder 92 having a plunger 93 is carried by the upper section of the C-frame 72, and this plunger is arranged to enter a bore 94 formed in the lower section of the frame. Upon the cylinder 92 being energized to retract plunger 93, the lower section of the C-frame including the bar 86 is free to have movement independent of the upper section, and such movement is effected by an elongated cylinder 95.

Considering now the operation of the apparatus described above it should be obvious that if both the top and bottom torches 68' and 69 is to be used the plunger 93 will remain in bore 94 to keep the top and bottom sections of the C-frame 72, and consequently the upper and lower torches, locked together. This setup will be used for the heavier stock gauges, and the sequence of operation of the apparatus will be as follows:

In standby, the strip clamp slides 22 will be widely separated as shown in FIGURE 1, and the clamps will be opened widely (8", for example) with the rolls 30 and 41 providing the support for the strip moving through the machine and defining a pass line therefor which is substantially midway vertically between the upper and lower platens of the clamps. Of course, suitable side and centering guides for the strip is commonly provided in apparatus of the general kind herein involved, but since such guides form no particular part of this invention, the same are not included herein. If it is desired to bevel the edges of the strip to be welded together, the gauge blocks 33 are set for the angle required and the cylinders 31 are actuated to move the arms 32 on the lower clamp platens up into engagement with these gauge blocks. As the tail end of the strip length running through the machine reaches the clamps, this strip end is stopped by suitable line control, not shown herein, so that the tail end of this strip length projects somewhat from the exit clamp after which the looping roll 41 at the exit end of the machine is raised about 8" by the adjacent cylinder 42 to impart an upwardly directed hump to the strip. The exit strip clamp is now closed. The strip positioning must be such that after actuation of roll 41 and closure of the exit clamp the trailing end of the strip length must still be completely within the cutting site of the adjacent abrasive wheel 57.

The leading end of the subsequent strip length is now fed into the machine and through the entry clamp, and after actuation of the entry looping roll 41 this entry clamp is closed. During such positioning and clamping of the strip the abrasive cutoff is in standby position shown in FIGURE 2 with the main motor 54 energized and the welding torches 68, 69 are also at standby position shown in this figure. Immediately upon clamping of both strip lengths the motor 62 is energized to move the abrasive wheels 57 across the strip. The cuttings or scrap enter into and remain in the tray 64, and by suitable automatic control means, not shown, the motor 62 reverses after the cut is completed to withdraw the cutoff apparatus back to its standby position. During such retraction the burrs thrown up on the stock by the coarser abrasive wheels 57 are removed by the flexible wire brush or sanding wheels 65.

Immediately upon retraction of the cutoff assembly, cylinders 31 are energized in reverse direction to untilt the strip clamps and bring the adjacent end portions thereof into a substantially common plane. After or during such manipulation the cylinders 35 and 37 are actuated to move the clamp slides 22 toward each other and to provide a parallel or tapered gap, if desired, between the adjacent trimmed edges of the strip lengths of a dimension determined by the settings of the stop nuts 36 and 38 or equivalent means as explained above. It should also be obvious that the stop nuts 36, 38 or equivalent means may be adjusted so as to bring the center of the open joint between the strip lengths into exact coincidence with the tips of the electrodes in the torches 68 and 69.

At standby, the torches 68' and 69 remain in proper adjustment as to position and as to electrode projection. Immediately upon the strip clamps being leveled and brought together, the motor 78 is energized in a direction to bring the welding torches to the work. Suitable automatic control, not shown, is provided to initiate the flow of welding current and protective gases at the proper time as the work is reached and, of course, the welding continues automatically across the strip. Likewise, the automatic wire feed control, if used, is initiated simultaneously with the flow of arcing current. During this welding traverse the cylinder 95 remains de-energized so that the torches move at a uniform speed determined by energization of the motor 78. The backup bar 86A moves along in back of the lower torch 69 and below the welded workpiece but it does not touch the latter since the tube 87 remains deflated. At the end of the welding traverse the torches are deactivated and are rapidly returned to their standby positions by the reverse energization of motor 78.

In some applications additional gas torches may be associated with the main welding torches to form an annealing operation on the welded joint.

When welding seams overhead as does the lower torch 69, it is desirable to oscillate the tip of the torch back and forth across the general line of weld so as to prevent the fusion metal from becoming overheated and breaking out in a downward direction. We therefore provide an adjustable eccentric 96 which is driven by a motor-reducer 97 on the bracket 71 and which, in turn, drives a lever 98 which is connected to the torch 69 near its upper end. Upon energization of motor 97 the upper end or tip of the torch 69 will oscillate back and forth across the seam being welded to accomplish the object above stated.

If the lower torch 69 is not to be used in the welding process but the backing bar 86A is to be used, the cylinder 92 is energized to retract plunger 93 thereby allowing the upper and lower sections of the C-frame 72 to be moved independently. In such cycle of operation the cylinder 95 may be energized immediately upon the strip clamps being leveled (if the strip edges are beveled) to rapidly move the bar 86A underneath the joint to be welded. Compressed air under controlled pressure is then supplied to the tube 87 to press the bar 86A up against the strip as is shown at FIGURE 5. Also as shown, the overhanging upper clamp plates limit the upward movement of the bar and prevent deformation of the strip before or during the welding cycle. As soon as the bar 86A is thus positioned, the motor 78 may be energized to initiate the welding traverse of the upper torch.

It should now be apparent that we have provided an improved method and apparatus for joining sheets and strip which accomplishes the objects initially set out above. By employing diamond abrasive cutoff wheels and driving the same at high speed and under substantial power to trim the strip ends while the latter are held in massive rigid clamps it is possible to vastly improve the edge conditioning of the strip immediately prior to welding. In addition to the high speed of operation of the cutoff or trimming apparatus, this apparatus is uniform in its operation and results regardless of the gauge or hardness of the stock. Also, it greatly enhances the versatility of the joining apparatus since it permits of a wide selection of specific welding processes which have been proven by experience to be the best for the particular work on hand. Thus, when welding the thinner gauges of mild steel the backup bar 86, the upper torch 68' with a nonconsumable electrode, no wire filler, and no or very little gap between the edges give the best results. On the other hand, when welding tough heavy gauge stainless steel, for example, the abrasive cutoff apparatus is entirely adequate, the trimmed edges may be beveled to provide the V-shaped welding groove to receive the fusing metal provided by a consumable electrode or a separate wire feed, and the oscillating lower torch may be employed to aid in complete fusion of the metal throughout the thickness of the stock without breakthroughs or punctures in the line of weld.

In either of the above welding examples, the satiny surface of the cut edges and the absolute linearity precision of the prepared edges reduces the gap required and enhances the initiation and solidarity of fusion whereby excellent welds of consistent quality may be obtained in a production machine commonly subjected to severe conditions of shop service.

While the preferred and above specifically described embodiment of our invention utilizes welding equipment of the electric arc type, it should be readily apparent that gas torches may be used with almost equal facility. Again, the precision and texture of the prepared edges will facilitate the complete and uniform fusion of the edges when brought to proper temperature. It should also be appreciated that improved results may be obtained when using the strip clamping assemblies and the edge trimming method and apparatus disclosed with electric resistance mash seam welding equipment wherein the upper and lower torches would be replaced by rotary electrodes. In such apparatus the tilting clamps would not only accomplish the narrow overlapping commonly desired but by chamfering the edges of the stock will provide surfaces which are easier to roll into the general plane of the stock. Again, for very light stock it would then be possible to make the backup bar highly current-conductive to cooperate with the upper welding wheel as the other electrode of the welding circuit.

Since, as shown above, various changes may be made in specific aspects of our method and apparatus herein specifically disclosed, reference should be had to the appended claims in determining the scope of the invention.

We claim:

1. Apparatus for joining metal sheets and strip in general end-to-end relation comprising a pair of longitudinally spaced stock clamps movable toward and away from each other so that when in spaced position the workpieces held therein may be trimmed to provide opposing prepared edges and when moved toward each other said edges may be welded together by a fusion process,
   means to move said clamps toward and away from each other,
   an upstanding frame having a pair of longitudinally spaced sections slideably supporting said clamps, an elongated and transversely disposed craneway supported on said frame sections,
   said craneway extending transversely beyond said frame sections on either side of the apparatus and mounting on one end portion thereof a carriage having a depending support extending centrally below said craneway,
   means to move said carriage back and forth along said craneway,
   a spindle mounting a pair of longitudinally spaced abrasive cutoff wheels journaled on said support, a motor mounted on said carriage for driving said spindle, said cutoff wheels being adapted to engage and trim workpieces held in said clamps when said clamps are retracted away from each other,
   a C-frame movably suspended from the opposite end portion of said craneway and having top and bottom reaches generally parallel with the craneway and having their free ends directed toward the space between said clamps,
   means to move said C-frame back and forth along said craneway, and
   welding apparatus carried by the free ends of said horizontal reaches of said C-frame operative upon movement of said C-frame to enter in between said clamps to weld the trimmed edge portions of said workpiece together after said clamps are moved toward each other into welding positions.

2. Apparatus according to claim 1 further characterized in that each of said clamps is mounted on its supporting frame section by pivotal connection to a slide assembly carried by the frame section and movable in longitudinal directions, the axes of said pivotal connections being parallel with said craneway, and means to tilt said clamps about said axes in directions such that portions of stock held therein and lying in a path of said cutoff wheels will be moved downwardly, the arrangement being such that during a cutting traverse of said wheels said stock pieces may each be formed with a beveled edge and that upon retraction of the cutting wheels and the subsequent untilting of the clamps and movement of the clamps together the juxtapositioning of the edges will provide a V-groove for the reception of weld metal.

3. Apparatus according to claim 1 further including an elongated horizontally disposed tray carried by said depending support in parallel relation to said craneway outwardly of said cutoff wheels, said tray being open in the direction of said wheels to slideably receive and retain scrap pieces cut off the workpieces by said wheels.

4. Apparatus according to claim 1 further including a guide rail fixed with respect to said frame sections and extending transversely below said clamp in parallel relation with said craneway, and follower rolls journaled on the free end portion of the lower reach of said C-frame to retain said C-frame in a common vertical plane during its traverse between said clamps.

5. Apparatus according to claim 1 further characterized in that said C-frame is split in its interconnecting section between said lower and upper reaches whereby said C-frame may be divided into upper and lower sections, means to releasably lock said upper and lower sections together, and
means independent of said craneway and said upper section to support and move said lower section parallel with respect to said upper section.

6. Apparatus according to claim 5 further characterized in that
said welding apparatus carried by the lower reach of said C-frame comprises a backup bar adapted to be moved between said clamps and below the workpieces held therein,
said backup bar being mounted for vertical movement with respect to said lower reach of said C-frame and said clamp, and means to raise and lower said backup bar.

7. Apparatus according to claim 2 further including adjustable means to limit the tilting movement of said clamps to thereby control the degree of bevel placed on the edges of the workpieces by operation of said cutoff wheels.

8. Apparatus according to claim 2 further including stop means to limit the untilting movement of said clamps to thereby automatically bring the trimmed edges of the workpieces held in said clamps into horizontally aligned relation when the clamps are moved toward each other preparatory to welding of the workpieces, one of said stop means being readily adjustable to vary the horizontal relation of one of the stock edges to the other of the stock edges, and an indicator including a vernier scale mounted in an outwardly accessible position to show the extent of adjustment of said one of said stop means.

9. Apparatus for joining metal sheets and strip in general end-to-end relation comprising
a pair of longitudinally spaced workpiece clamps movable toward and away from each other,
means to move said clamps toward and away from each other,
an abrasive cutoff movable between said clamps generally parallel therewith and having opposite cutting faces to abrasively trim the end edges of workpieces held in said clamps,
means to move said cutoff into and out of the space between said clamps,
a C-frame having upper and lower reaches and open in the direction of said clamps and slideably mounted for movement along the axis of movement of said abrasive cutoff,
means to move said C-frame back and forth along said axis, and
welding apparatus carried by the free ends of said horizontal reaches of said C-frame operative upon retraction of said abrasive cutoff and inward movement of said clamps to enter in between said clamps to weld the trimmed edge portions of said workpieces together.

10. Apparatus for joining flat-lying metal sheets and strip in general end-to-end relation comprising
a pair of clamps to hold the end edges of the workpieces in juxtaposed position with respect to each other for welding,
a C-frame having horizontal upper and lower reaches, being open in the direction of said clamps, and movable along an axis coincident with the line of said edges,
means to move said C-frame back and forth along said axis,
an electric arc welding torch carried by the free end of said upper reach to apply welding heat to the top of the workpieces along said line of edges and an electric arc welding torch carried by the free end of the bottom reach of said C-frame to weld the underside of said edges together, and means to oscillate said lower torch back and forth along the line separating said edges during inward movement of said C-frame.

11. Apparatus according to claim 10 further including means on said free end of said bottom reach of said C-frame to adjust the position of said lower torch whereby it may either lead or lag the upper torch during a welding traverse along the line of said edges.

12. Apparatus for joining strip in general end-to-end relation comprising
a pair of longitudinally spaced frame sections each having a pair of transversely spaced and parallel plate-like vertically disposed members,
longitudinally extending plate-like slides disposed in generally vertical planes on the inner faces of each of said members and parallel therewith,
vertical and longitudinally spaced anti-friction rollers journaled on said members and engaging top and bottom edge portions of said slides to guide the movement of the latter,
an entry strip clamp carried by the slides in one of said sections and an exit strip clamp carried by the slides in the other of said sections,
means to open and close said clamps,
a horizontally disposed cylinder carried by each of said members having a double-ended piston rod one end of which is connected to an adjacent slide,
the other ends of said rods having adjustable stop nuts thereon whereby the movement of said clamps in one direction may be accurately controlled, and
means positioned between said clamps to weld together strip pieces held therein when said slides are moved toward each other.

References Cited by the Examiner
UNITED STATES PATENTS

| | | | |
|---|---|---|---|
| 1,997,969 | 4/35 | Hopkins | 219—137 |
| 2,649,528 | 8/53 | Koenig et al. | 219—137 |
| 2,743,692 | 5/56 | Wietzel et al. | 219—125 X |
| 2,800,568 | 7/57 | Cooper | 219—82 |
| 2,866,077 | 12/58 | Morton et al. | 219—125 |
| 2,970,206 | 1/61 | Uhrain | 219—125 |

RICHARD M. WOOD, *Primary Examiner.*